United States Patent [19]
Maeda et al.

[11] Patent Number: 5,349,452
[45] Date of Patent: Sep. 20, 1994

[54] IMAGE PROCESSING SYSTEM CAPABLE OF ATTAINING COLOR COINCIDENCE BETWEEN INPUT AND OUTPUT IMAGES

[75] Inventors: Masahiro Maeda; Toru Yamasaki; Masayuki Kurahashi; Noriaki Seki, all of Kanagawa, Japan

[73] Assignee: Fuji Xerox Co., Ltd., Tokyo, Japan

[21] Appl. No.: 187,730

[22] Filed: Jan. 28, 1994

[30] Foreign Application Priority Data

Jan. 29, 1993 [JP] Japan .................. 5-32534

[51] Int. Cl.$^5$ .............................. H04N 1/46
[52] U.S. Cl. .................... 358/527; 358/520
[58] Field of Search ............... 358/518, 520, 527, 529

[56] References Cited

U.S. PATENT DOCUMENTS

| | | | |
|---|---|---|---|
| 4,926,254 | 5/1990 | Nakatsuka et al. | 358/527 |
| 4,956,703 | 9/1990 | Uzuda et al. | 358/527 |
| 4,958,220 | 9/1990 | Alessi et al. | 358/527 |
| 4,979,032 | 12/1990 | Alessi et al. | 358/527 |

Primary Examiner—Stephen Brinich
Attorney, Agent, or Firm—Finnegan, Henderson, Farabow, Garrett & Dunner

[57] ABSTRACT

A color space of input image information sent from an image input device is recognized, and, if it is not the standard color space, it is judged whether the input image information is associated with color correction data. If the input image information is not on the standard color space but associated with color correction data, it is converted to image information on the standard color space using the associated color correction data. If the input image information is neither on the standard color space nor associated with color correction data, it is converted to image information on the standard color space using color correction data read from a storage device. A conversion device converts the image data on the standard color space to YMCK image information, which is sent to an image output device.

7 Claims, 12 Drawing Sheets

```
/* NCA  Procedure syntax */

<NCA_Procedure> ::=  <BEGIN> <NCA_Transform_attribute_list>
<END>;

<NCA_Transform_attribute_list>  ::= <NCA_ATTRIBUTE> |
<NCA_Transform_attribute_list><SEPARATOR><NCA_ATTRIBUTE>

<NCA_ATTRIBUTE> ::= <NCA_ATTRIBUTE_NAME> <ATTRIBUTE_SEPARATOR>
<VALUE>
    | "procedure_list" <ATTRIBUTE_SEPARATOR> <NCA_PRIMITIVE_LIST>;
<NCA_ATTRIBUTE_NAME>  ::= "name"
    | "input_colorspace" | "output_colorspace"
    | "input_range" | "output_range"
    | "input_round_proc" | "output_round_proc";

<NCA_PRIMITIVE_LIST>  ::= <BEGIN><NCA_PRIMITIVE_SEQUENCE><END>
    | <NCA_PRIMITIVE>;
<NCA_PRIMITIVE_SEQUENCE>::= <NCA_PRIMITIVE>
    | <NCA_PRIMITIVE_SEQUENCE><SEPARATOR><NCA_PRIMITIVE>;
<NCA_PRIMITIVE> ::= <BEGIN> <NCA_PRIMITIVE_ATTRIBUTE_LIST> <END>;
<NCA_PRIMITIVE_ATTRIBUTE_LIST> ::= <NCA_PRIMITIVE_ATTRIBUTE>
    |
<NCA_PRIMITIVE_ATTRIBUTE_LIST><SEPARATOR><NCA_PRIMITIVE_ATTRIBUTE>
;

<NCA_PRIMITIVE_ATTRIBUTE>  ::=
    <NCA_PRIMITIVE_ATTRIBUTE_NAME> <ATTRIBUTE_SEPARATOR> <VALUE>;

<NCA_PRIMITIVE_ATTRIBUTE_NAME>  ::= "type" | "base" | "parameter"
| "min" | "max"
    | "round_min" | "round_max";

<BEGIN> ::= <IGNORE_SPACE><L_BRACE><IGNORE_SPACE>;
<END>   ::= <IGNORE_SPACE><R_BRACE><IGNORE_SPACE>;
<SEPARATOR>  ::= <IGNORE_SPACE><COMMA><IGNORE_SPACE>;
<TERMINATOR> ::= <IGNORE_SPACE><SEMICOLON><IGNORE_SPACE>;
<ATTRIBUTE_SEPARATOR>::= <IGNORE_SPACE><COLON><IGNORE_SPACE>;
<IGNORE_SPACE>  ::= NULL | <IGNORE_SPACE><SPACES>;
<SPACES>::= <SPACE> | <TAB> | <CR>;
<L_BRACE>  ::= "{";
<R_BRACE>  ::= "}";
<COMMA>    ::= ",";
<PERIOD>   ::= ".";
<COLON>    ::= ":";
<SEMICOLON>  ::= ";";
<CR>       ::= "\n";
<SPACE>    ::= " ";
<TAB>      ::= "\t";
<NUM>      ::= [0-9];
<ALPHABET> ::= [a-zA-Z];
```

FIG. 5

```
XYZ2CIE_RGB{
  name:"XYZ2CIE_RGB",
  input_colorspace:"XYZ",
  output_colorspace:"CIE_RGB",
  procedure_list:{
     type:"MATRIX",
     parameter:{
         {2.3643, -0.8968, -0.4679},
         {-0.5154, 1.4262, 0.0887},
         {0.0051, -0.0141, 0.0092}
     }
  }
}
```

WHOLE RESERVATION WORDS TABLE 73

| RESERVATION WORD | PROCESSING |
|---|---|
| { | pushdown |
| } | popup |
| ... | ... |

PARTIAL RESERVATION WORDS TABLE 71

| RESERVATION WORD | PROCESSING |
|---|---|
| name | name_entry |
| input_colors pace | input_colors pace_entry |
| output_color space | output_color space_entry |
| input_range | input_range _entry |
| output_range | output_range_entry |
| input_round _proc | input_round _proc_entry |
| output_round_proc | output_round_proc_entry |
| procedure_list | procedure_list_entry & pushdown |

PARTIAL RESERVATION WORDS TABLE 72

| RESERVATION WORD | PROCESSING |
|---|---|
| { | pushdown |
| } | terminate & popup |
| type | type_entry |
| base | parameter_entry |
| parameter | parameter_entry |
| input_range | input_range _entry |
| output_range | output_range_entry |
| input_round _proc | input_round _proc_entry |
| output_round_proc | output_round_proc_entry |

IMAGE PROCESSING SYSTEM CAPABLE OF ATTAINING COLOR COINCIDENCE BETWEEN INPUT AND OUTPUT IMAGES

BACKGROUND OF THE INVENTION

The present invention relates to a system for processing a document and an image that are associated with color information.

To produce and output a color document or image by a document/image processing apparatus, for instance, to output an image displayed on a CRT with a printer, such a process as converts an additive mixture type color expression of the CRT to a subtractive mixture type color expression of printer inks is required. Conventionally, a system is constructed on the assumption that such processing is performed in each device. Therefore, conversion processes are not unified and a system cannot accommodate a case in which a device is incapable of required conversion between color expressions (see Reference 1).

Among mechanisms for attaining such color coincidence are PostScript Level-2 (Reference 2), SPDL and CES (Reference 2), ODA (Reference 4) and X-CMS (Reference 5).

Each of PostScript Level-2 and SPDL is a PDL (page description language), and they are almost equivalent to each other. In those mechanisms, color specification to realize the color coincidence can be effected in the following manners.

1) Specification in a standard color space of, for instance, CIE.

2) Specification by attaching a description (program) of a conversion procedure to the above color space.

However, in the above mechanisms, color correction processing is required on the PDL creator side, re-editing performance is poor, and it is difficult to accommodate such image input devices as a scanner.

CES ( color encoding standard) prescribes color specification methods for realizing color coincidence in, for instance, InterPress that is a PDL, and realizes color coincidence in a standard color space of, for instance, CIE. However, since a specification method is a subset prescribed in InterPress, an interPress processing mechanism is required and it is difficult to accommodate such image input devices as a scanner which are not related to InterPress.

ODA ( open document architecture ) is a document processing scheme standardized by ISO/CCITT. In ODA, color specification can be effected in the following manners.

1) Specification in a standard color space of, for instance, CIE.

2) Specification by attaching of a description (matrix and LUT) of a conversion procedure to the above color space.

However, like PostScript Level-2 and SPDL, it is difficult for ODA to accommodate to such image input devices which need not deal with ODA.

X-CMS (X-window color management system) is intended to realize faithful color reproduction on a CRT in an X-window system. In X-CMS, color specification to realize the color coincidence can be effected in the following manners.

1) Specification in a standard color space of, for instance, CIE.

2) Specification performed such that a sender (usually an application) requests a receiver (output device, usually a CRT) to supply color correction data on the receiver side and the sender performs a color correction of the receiver side.

However, since X-CMS serves only for window systems and is intended to realize the color coincidence mainly on a CRT, it hardly accommodate such image input devices as a scanner and such image output devices as a printer.

List of references

Reference 1: Toru Yamasaki, "Technology for Color Document Interchange," The Journal of the institute of Image Electronics Engineers of Japan, Vol. 20, No. 6, pp. 617–622 (1991) This reference describes results of a survey on color document interchange.

Reference 2: Adobe Systems Incorporated, "PostScript Reference Manual—2nd Edition".

Reference 3: Xerox Corporation, "Color Encoding Standard," XNSS-289107 This reference describes standards to be used in expressing colors in InterPress (PDL of Xerox Corporation ) and in RES ( raster encoding standard).

Reference 4: ISO, "information Processing—Text and Office Systems—Office Document Architecture (ODA) and Interchange Format Amendment 2: Support for Colour," ISO-DIS 8613/Amd. 2, October 1991 This reference describes standards to be used in expressing colors in ODA documents. Correction data of a 3×3 matrix, a look-up table, etc. can be used.

Reference 5: "An Introduction to X Window System 34, 35," UNIX Magazine 1992/June-July, Vol. 7, No. 6-7 This reference describes color specification methods in an X-window system using X-CMS.

Conventionally, color coincidence in a specific application is intended, and there cannot be obtained color coincidence for general purposes nor between difference applications. Not being a unified scheme enabling color coincidence for interconnected input and output devices of various kinds, conventional schemes are deficient in expandability and cannot serve for general purposes.

SUMMARY OF THE INVENTION

An object of the present invention is to realize color coincidence between different applications and expandability enabling interconnection of various input and output devices.

According to the invention, in transmitting color input image information from an image input device to an image output device by use of a color processing system to which at least one image input device and at least one image output device can be connected, a color coincidence processing method comprises the steps of:

recognizing a color space of input image information and, if it is not a standard color space, judging whether the input image information is associated with color correction data; and realizing color coincidence between an input image and an output image by:

using the standard color space, if the input image information is on the standard color space;

performing a color correcting operation by using the color correction data associated with the input image information, if the input image information is not on the standard color space but associated with the color correction data; or performing a color correcting operation by using color correction data stored in the color processing system, if the input image information is neither on the standard color space nor associated with the color correction data.

Further, according to the invention, an image processing system which can be connected to an image input device that produces first image information on a first, arbitrary color space and to an image output device that processes image information on an arbitrary color space, comprises:

means for recognizing the first color space and, if it is not a standard color space, whether the first image information is associated with color correction data to be used for conversion to the standard color space;

means for storing a plurality of color correction data to be used for conversion to the standard color space;

means for designating an image output device;

means for converting the first image information not on the standard color space to second image information on the standard color space using the color correction data associated with the first image information, and for converting the first image information neither on the standard color space nor associated with color correction data to second image information on the standard color space using corresponding one of the color correction data stored in the storing means, in accordance with the recognized first color space and a color space of the designated image output device; and means for sending the first or second image information on the standard color space to the designated image output device.

BRIEF DESCRIPTION OF THE DRAWINGS

FIG. 4 shows an example of a color processing description syntax using BNF;

DESCRIPTION OF THE PREFERRED EMBODIMENTS

Embodiment 1

Figure 2:
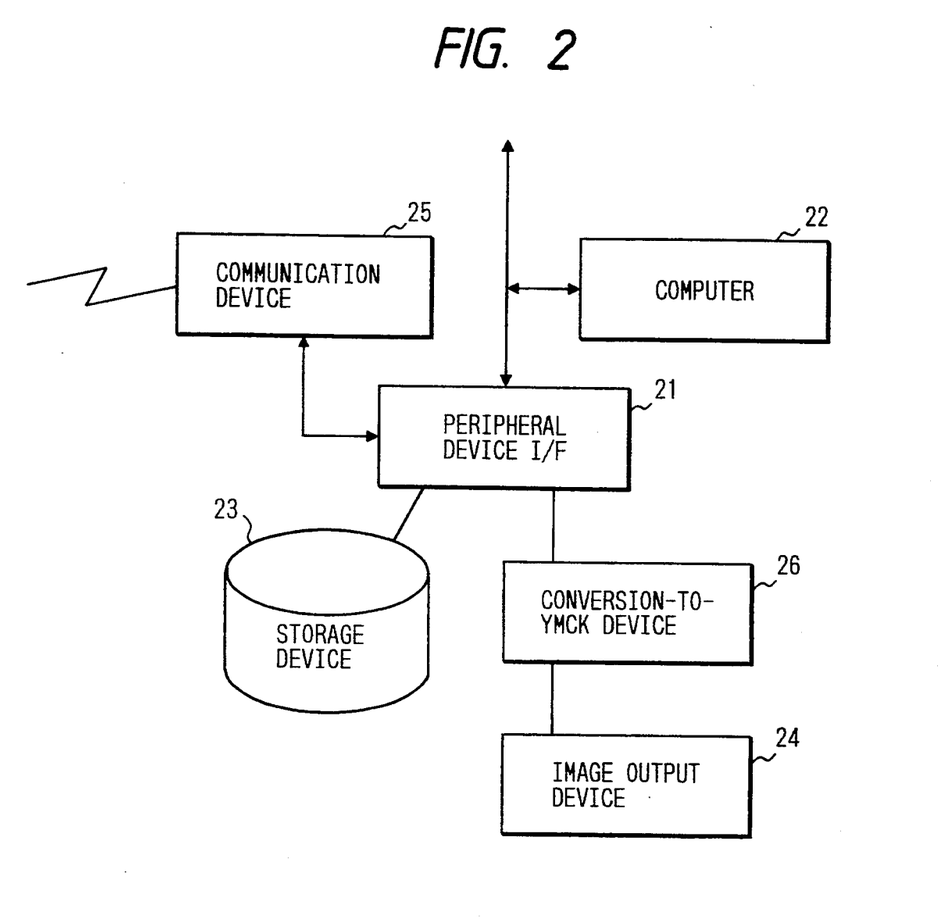
FIG. 2 is a block diagram showing the configuration of the system of the first embodiment.

FIG. 2 shows a configuration of a system according to a first embodiment of the present invention. With a computer 22 having a peripheral device interface 21, a storage device 23, an image output device 24 and a communication device 25 are interconnected through the peripheral device interface 21. With this constitution, image information can be received from other various devices through the communication device 25, and the system can serve as a print server in a communication network. Therefore, the system is required to accommodate various input devices.

This system uses the L*a*b* space of CIE as the standard color space. A conversion-to-YMCK device 26 for conversion from the standard color space to the YMCK space is provided upstream of the image output device 24, because the image output device 24 specifies a color by densities of YMCK inks.

Input image information received from other various devices through the communication device 25 are classified into the following three types.

1) Input image information on the standard color space.

2) Input image information not on the standard color space but associated with color correction data.

3) Input image information neither on the standard color space nor associated with color correction data.

Figure 1:
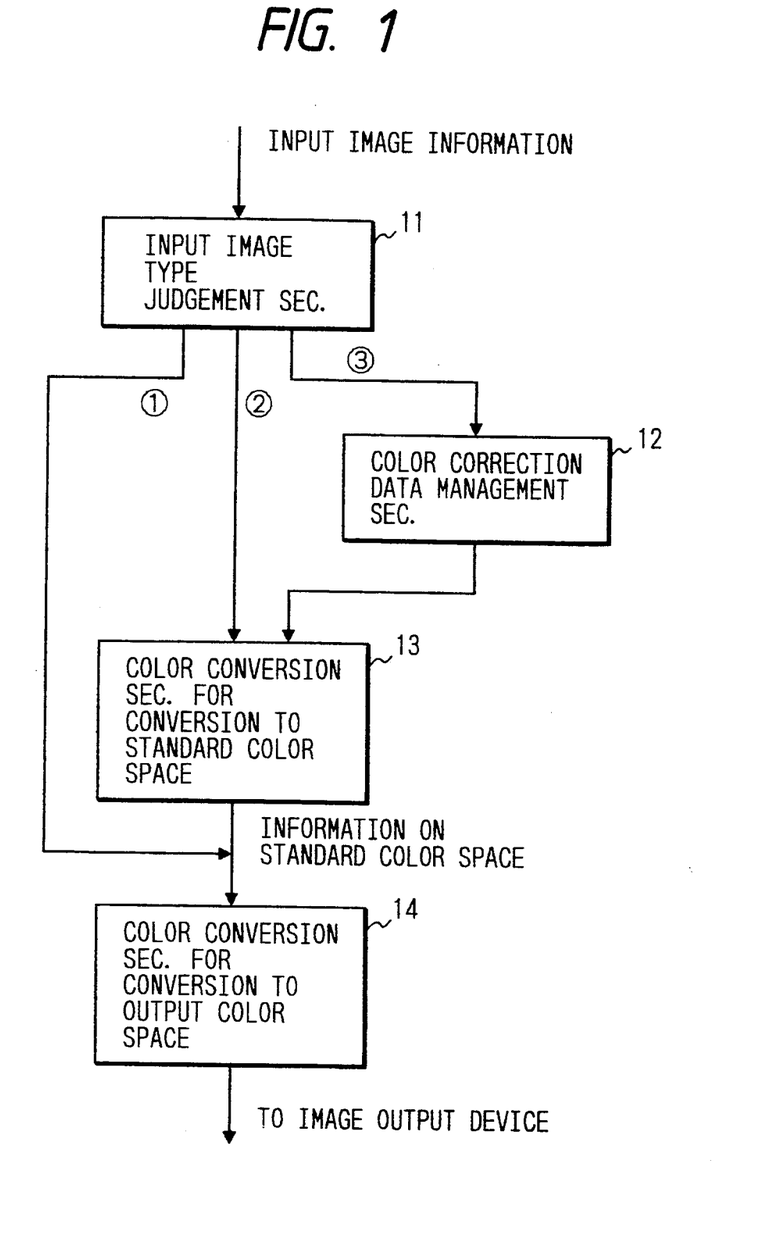
FIG. 1 is a block diagram showing a conversion means of a system according to a first embodiment of the present invention.

In the system of this embodiment, input image information of type (1) is forwarded to the conversion-to-YMCK device 26 as it is. On the other hand, input image information of type (2) or (3) is forwarded to the conversion-to-YMCK device 26 after being converted to image information on the standard color space. For that purpose, a conversion means shown in FIG.. 1, which is implemented as a program to be executed by the computer 22, is provided in this embodiment.

As shown in FIG. 1, the conversion means for converting input image information, which is of one of various types, to information on the standard color space includes an input image type judgment section 11 for judging which of the types (1)–(3) the input image information belongs to, a color correction data management section 12 for managing color correction data necessary to process input image information of type (3), and a color conversion section 13 for converting the input image information to information on the standard color space, using the color correction data in the case where the input image information is of type (3). In FIG. 1, the function of the conversion-to-YMCK device of FIG. 2 is shown as a color conversion section 14.

Figure 3:
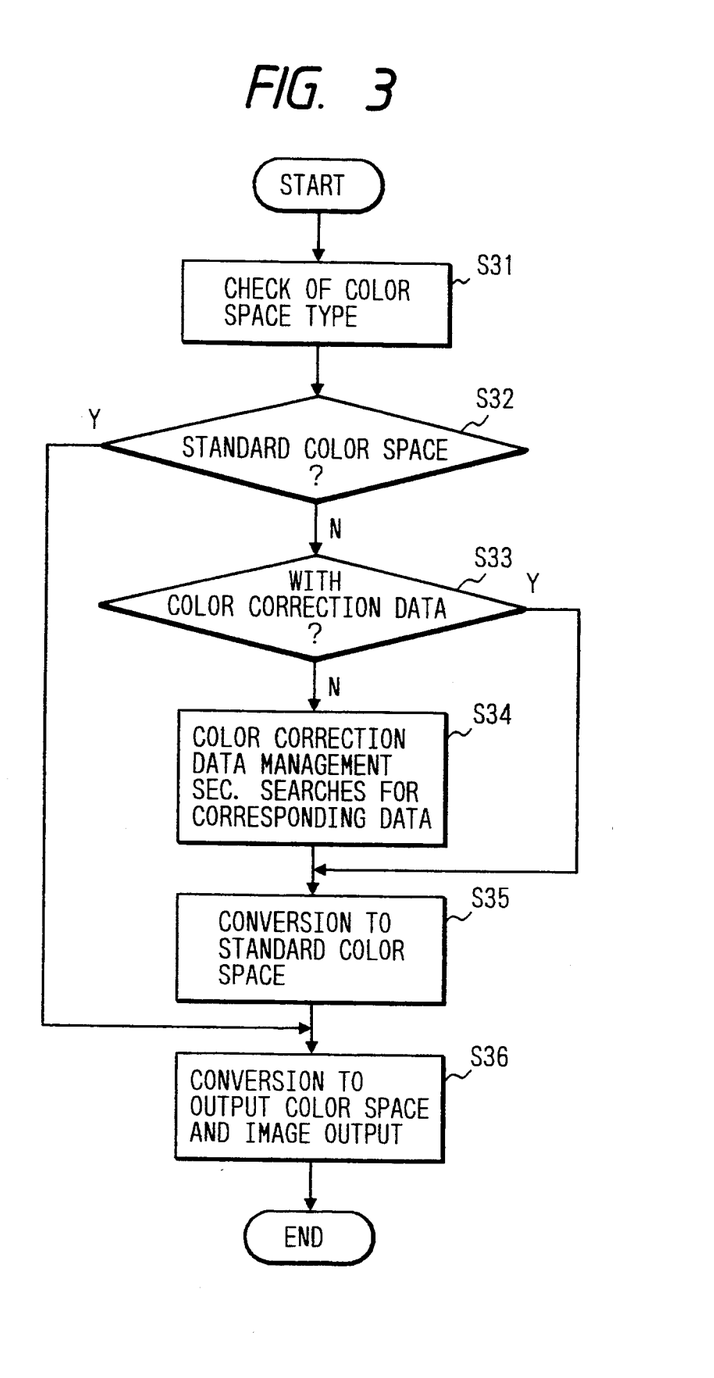
FIG. 3 is a flowchart showing a processing procedure of the system of the first embodiment.

FIG. 3 shows a processing procedure of the system of this embodiment.

First the color space type of the input image information is checked in step S31. Then, the input image type judgment section 11 judges whether the color space of the input image information is the standard color space (step S32), and judges, if not the standard color space, whether the input image information is associated with color correction data (step S34).

If the color space of the input image information is judged to be the standard color space, the input image information is forwarded to the conversion-to-YMCK device 26 (color conversion section 14) as it is. The image information is converted to YMCK information, which is sent to the image output device 24 to produce an image (step S36).

If the input image information is judged to be not on the standard color space but associated with color correction data, the input image information is converted to information on the standard color space by the color conversion section 13 using the color correction data (step S35), and then converted by the conversion device 26 to YMCK information, which is sent to the image output device 24 to produce an image (step S36).

If the input image information is judged to be neither on the standard color space nor associated with color correction data, the color correction data management section 12 searches the storage device 23 for color correction data suitable for the color space of the input image information (step S34). The color conversion section 13 converts the input image information to information on the standard color space using the color correction data thus found (step S35). The image information is then sent to the image output device 24 via the conversion device 26, to produce an image (step S36).

Next, a description will be made of an example in which a color processing description language is employed to allow the single color conversion section 13 to perform different operations for various kinds of input image information. FIG. 4 shows an example of the color processing description syntax. This example is written in BNF (Backus-Naur form), which is mainly intended to describe conversion between color spaces.

The BNF is a metalanguage used for specifying a syntax of a program language as symbols or symbol strings. The BNF is characterized by use of a (metalanguage) variable having a value of a symbol string. The variable is expressed by a character string enclosed by "<" and ">". Examples of the variable are as follows.

<character>, <character string>, <formula>, <sentence>, <number>, <numeral>

The variable represents an element of a syntax, and a value of the variable is a specific symbol or symbol string. To specify values which can be taken by the variable, the BNF uses two special symbols " =" and "|". For example, according to the BNF, the fact that a variable <character> can take one of values a, b, c and d is expressed as <character>  =a|b|c|d|.

The symbol " =" serves to define values of a variable written on its left side, and the symbol "|" means "or".

Figure 5:
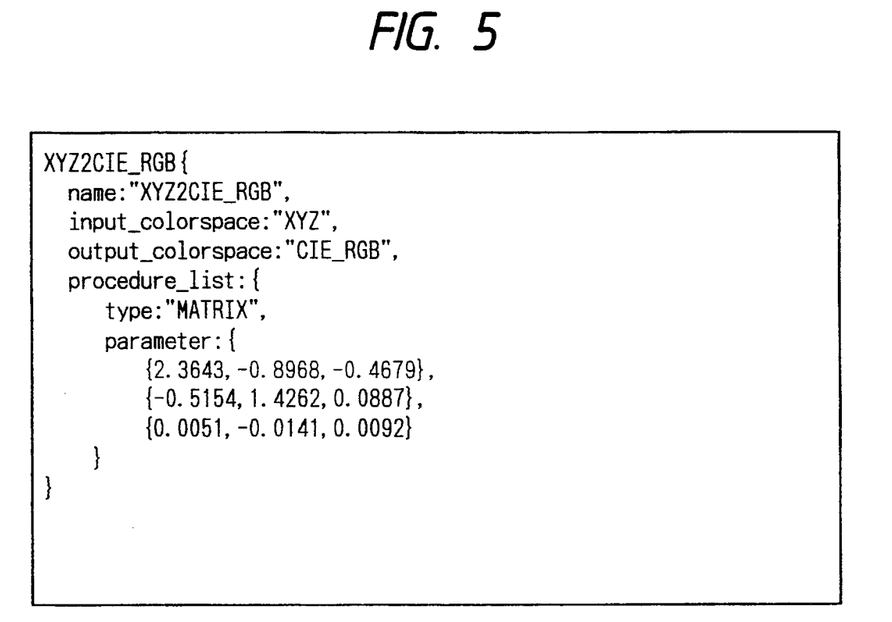
FIG. 5 shows an example of a color processing description written in accordance with the syntax of FIG. 4.

FIG. 5 is an example of a color processing description that is written according to the syntax of FIG. 4. This example describes a processing procedure of a conversion from the XYZ color space to the RGB color space of CIE.

In FIG. 5, "input_colorspace: "XYZ"" indicates a color system before the conversion, and "output_colorspace: "CIE_RGB" indicates a color space after the conversion. The actual procedure is written after "procedure_list:". In this example, the procedure includes "type: "MATRIX"", that is, a matrix operation. The elements of the matrix are indicated in "parameter: {...}". Although this example includes only one operation, the grammar allows operations like this examples to be written in succession.

The color processing description of FIG. 5 is interpreted as follows according to the syntax of FIG. 4. The whole description of FIG. 5 corresponds to the equation on the first line of FIG. 4. More specifically, "XYZ2CIE_RGB" in FIG. 5 corresponds to <NCA Procedure> in FIG. 4, "{" following "XYZ2-CIE_RGB" corresponds to <BEGIN>, and "}" on the last line corresponds to <END>. The items enclosed by "{" (corresponding to <BEGIN>) and "}" (corresponding to <END>) correspond to <NCA_Transform_attribute_list>.

<NCA_Transform_attribute_list> is expressed by the equation on lines 3-4, and means a list of a plurality of <NCA_ATTRIBUTE> separated by <SEPARATOR> (corresponding to ","). <NCA_ATTRIBUTE> is expressed by the equation on lines 5-7. More specifically, each of the items on lines 2-4 of FIG. 5 (i.e., items respectively starting with "name", "input_colorspace" and "output_colorspace") corresponds to the first form on the right side of the equation on lines 5-7 of FIG. 4. The item on lines 5-11 of FIG. 5, which starts with "procedure_list", corresponds to the second form on the right side of the equation on lines 5-7 of FIG. 4. For example, "name" on line 2 of FIG. 2 corresponds to <NCA_ATTRIBUTE_NAME>, ":" corresponds to <ATTRIBUTE_SEPARATOR>, and "XYZ2-CIE_RGB" corresponds to <VALUE>.

In the above manner, a syntax of a programming language can be expressed by use of the BNF. Therefore, by using the BNF, it becomes possible to automatically generate a program for analyzing the syntax. There actually exists a program (generally called "parser generator" or "compiler-compiler") for generating a syntactic analysis program with a syntax description written in the BNF as an input. For example, in the UNIX operating system, a parser generator called YACC (yet another compiler-compiler) is provided as a standard part.

That is, by using the BNF, a part of a program can be generated automatically, a program can be simplified, and the amount of codes can be reduced. In general, to run a program on a different type of computer, it is necessary to rewrite codes. A program having a small amount of codes is highly portable because of fewer rewriting operations. Thus, the use of the BNF makes it easier to perform the same processing on a plurality of systems/environments.

Color processing description files like the one shown in FIG. 5 are prepared for respective color spaces each of which may be a color space of input image information. When the color space type of the input image information is recognized in the flow of FIG. 3, the color processing description file corresponding to that color space type is used in the processing for conversion to the standard color space. In this processing, as will be described below, the color processing description is analyzed to obtain structures suitable for the internal processing. Actual color processing is performed based on those structures.

Figure 6:
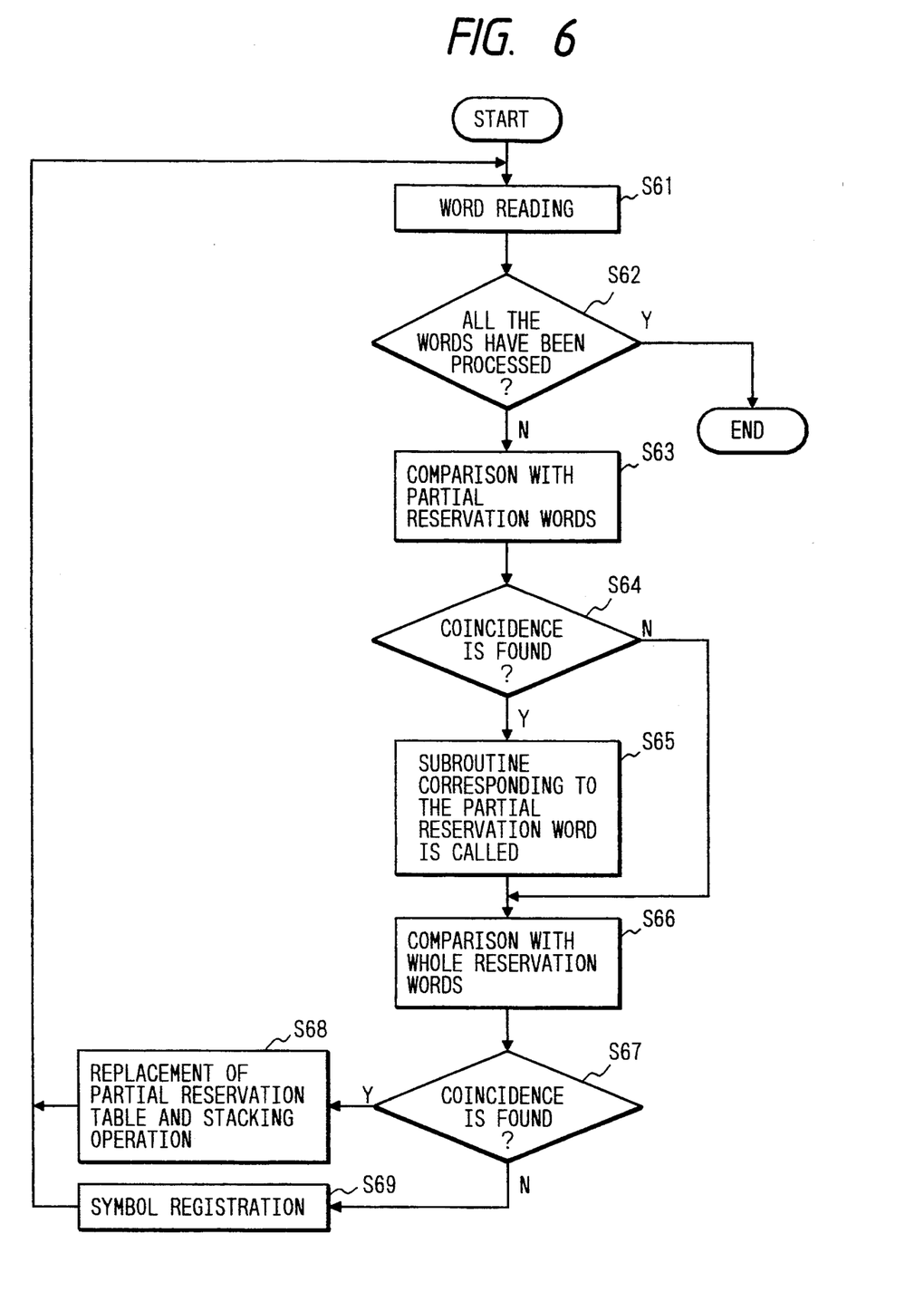
FIG. 6 is a flowchart showing an example of a color processing description analysis.

FIG. 6 is a flowchart showing an example of the color processing description analysis. The description analysis may be performed by generating an analysis program with a parser generator based on the syntax of FIG. 4. On the other hand, in the flowchart of FIG. 6, the description analysis is performed mainly by table look-up and table replacement.

In step S61, the color processing description file selected in accordance with the above judgment is read word by word. In step S62, it is judged whether all the words have been processed. If the judgment is affirmative, the analyzing process is finished. If the judgment is negative, the following processing is performed for each word.

Figure 7:
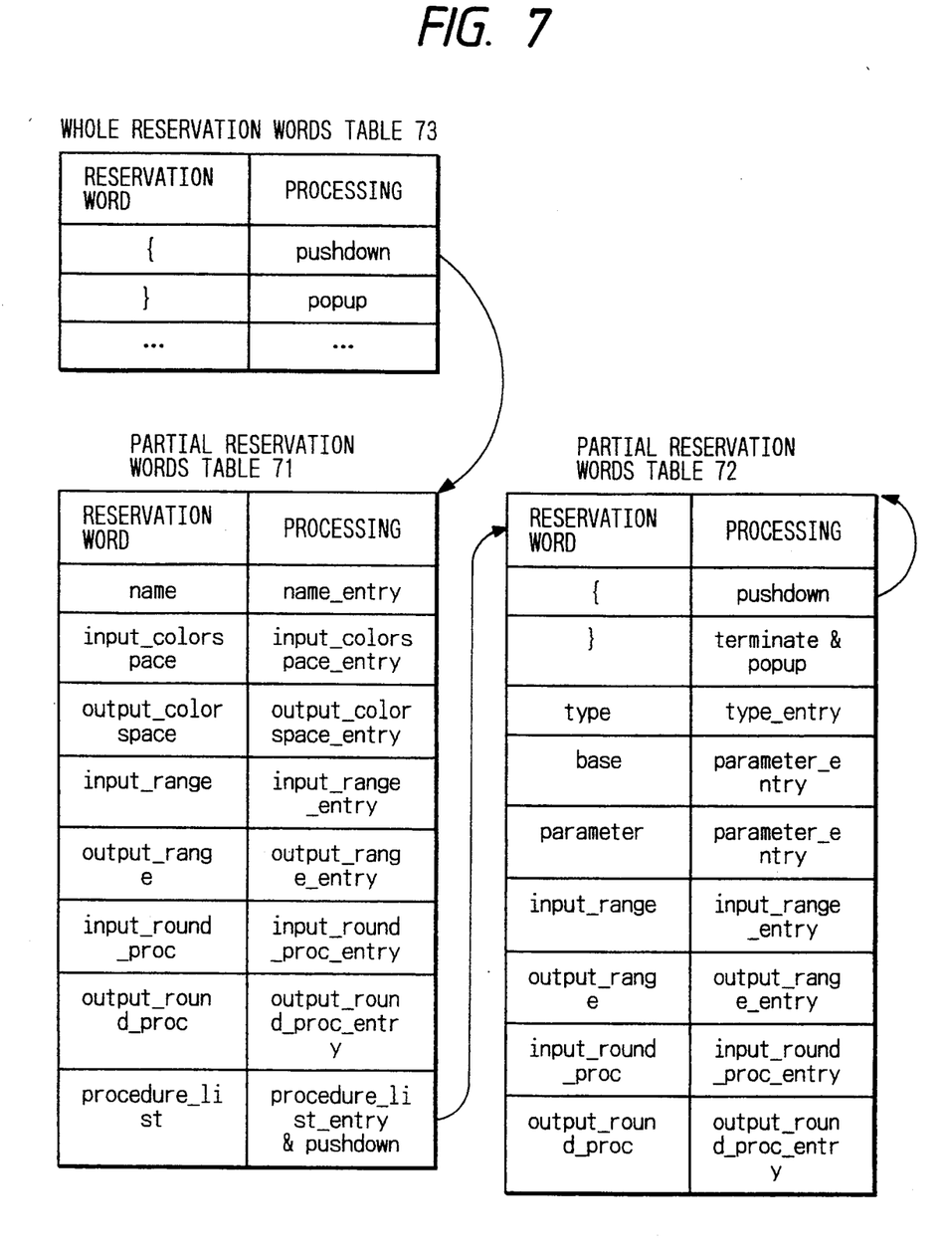
FIG. 7 shows reservation words tables used in the analysis of FIG. 6.

In step S63, the word of the color processing description just read is compared with reservation words of a partial reservation words table 71. If a reservation word that coincides with the word just read is found (step S64), a subroutine corresponding to that partial reservation word is called and executed (step S65). In the execution of the subroutine, the color correction data associated with the input image information or that obtained by the color correction data management section 12 is used when necessary.

When the execution of the subroutine is finished or when no coincidence with the reservation words of the partial reservation words table 71 was found, the word just read is compared with the reservation words of a whole reservation words table 73 (step S66). When coincidence is found (step S67), the partial reservation words table 71 for comparison is replaced with another one and a stacking operation is performed (step S68). When no coincidence is found in step S67, symbol registration is effected in step S69.

FIG. 7 shows examples of reservation tables used in the flow of FIG. 6. Reservation words that apply to the entire description are listed on the whole reservation words table 73, and reservation words that apply partially are listed on the partial reservation words tables 71 and 72. The analysis mode is switched by changing the partial reservation table in accordance with the situation. In the example of FIG. 7, the partial reservation words table 71 is used to analyze the entire color processing description, and the partial reservation words table 72 is used to analyze the specific part of the description, i.e., parameters of "procedure_list".

Figure 8A:
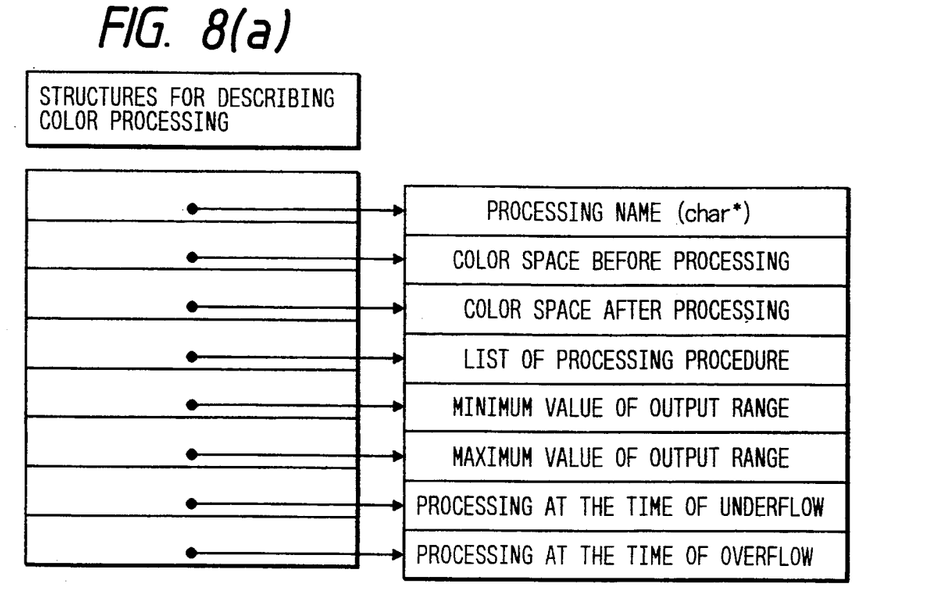
FIGS. 8(a) and 8(b) show an example of a manner of storing analysis results.
Figure 8B:
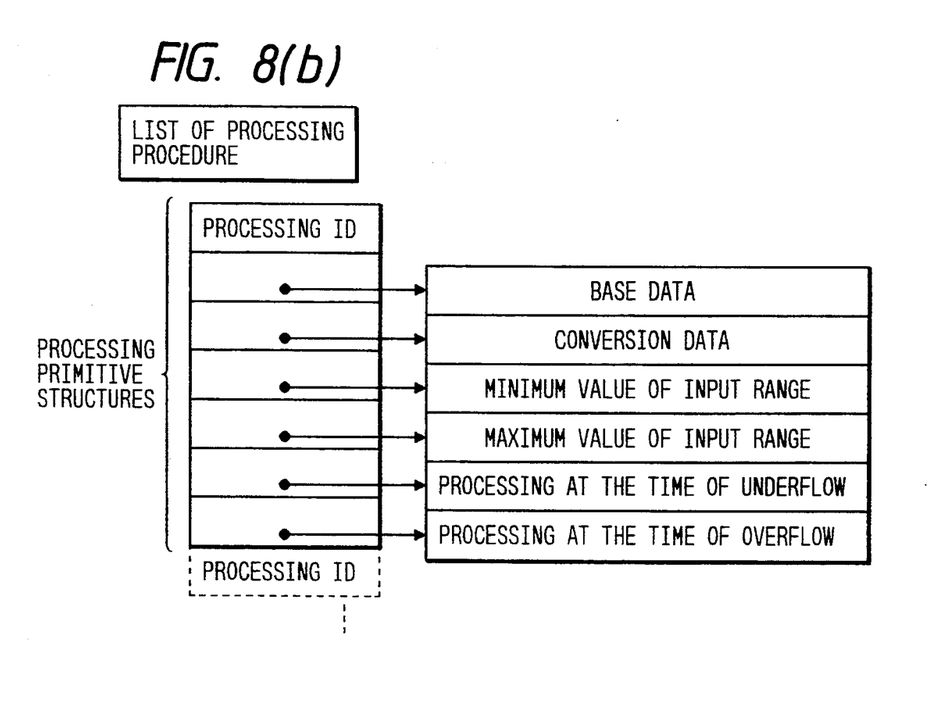

Almost every processing listed on the reservation tables is merely a conversion to an internal expression. FIG. 8 shows an example showing how results of such analyses are stored. This example uses a form of structures that depend on the programing language, that is, on the processing system.

The flow of FIG. 6 using the reservation words tables of FIG. 7 will be explained for the case of receiving the processing description of FIG. 5. First, the word "XYZ2CIE_RGB" on the first line of FIG. 5 is read in step S61. Since no partial reservation words table is set in the initial setting, no coincidence is found in step S64 and step S65 is skipped. The, in step S66, the word just read is compared with the reservation words of the whole reservation words table 73. Since no coincidence is found in step S67, the process goes to step S69, where the word just read is regarded as a symbol and registered in a symbol table.

Then, the next word "{" is read in step S61. Since the coincident reservation word is found in the whole reservation words table 73 (the judgment in step S67 is affirmative), the process of "pushdown" that is listed on the whole reservation words table 73 is effected; that is, the partial reservation words table 71 is set as the table for the comparison in step S63. Further, the current state is saved on a stack to enable continuation of the processing at the time of returning to this state by popup processing.

Then, the word "name" is read in step S61, and compared with the reservation words of the above-set partial reservation words table 71 in step S63. Since the coincident word is found in the partial reservation words table 71 (the judgment in step S64 is affirmative), in step S65 the subroutine of the processing "name_entry" that corresponds to the word "name" in the partial reservation words table 71 is called. By executing this subroutine, the second-line sentence of FIG. 5 is read from "name" to the punctuation (","), and the character string "XYZ2CIE_RGB" is converted to an internal format and stored as a value of "name". The third and fourth lines of FIG. 5 are processed in the same manner.

In processing "procedure_list" on the fifth line of FIG. 5, the whole reservation word "{" serves to set the one-step deeper partial reservation words table 72 in step S68. And the current state is saved on the stack to enable continuation of the processing at the time of returning to this state. The similar processing is then performed except that the partial reservation words table 72 continues to be used until processing "}". When the last line of FIG. 5 is read to leave no word to be read, the analysis is finished by a judgment in step S62.

Figure 9:
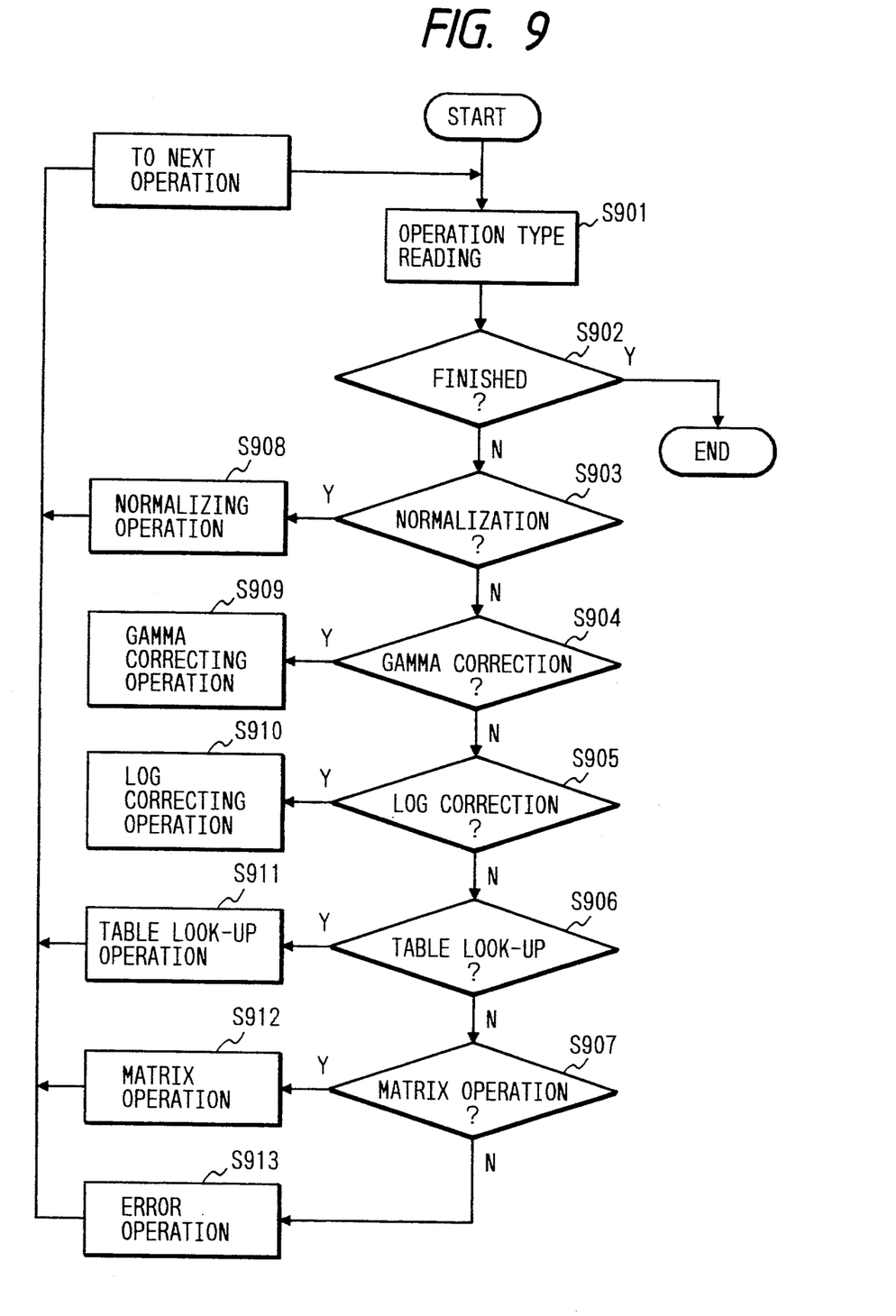
FIG. 9 is a flowchart showing an example of processing performed on actual color values of input image information.

After a color processing description representing a final processing procedure is obtained by the above analysis, actual color values of the input image information are processed. FIG. 9 is a flowchart showing an example of such processing. In this example, the color value processing is a combination of basic operations including a normalization, gamma correction, logarithm correction, table look-up and matrix operation. The operation type is judged for each step of the processing procedure (steps S903–S907), and a corresponding operation is effected (steps S908–S913).

Embodiment 2

In the first embodiment, since the image output device is paired with the correction computing section, the correction computing section is needed for each image output device. A second embodiment is different from the first embodiment in that it is so constructed that a single correction computing section can be shared by a plurality of image output devices.

Figure 10:
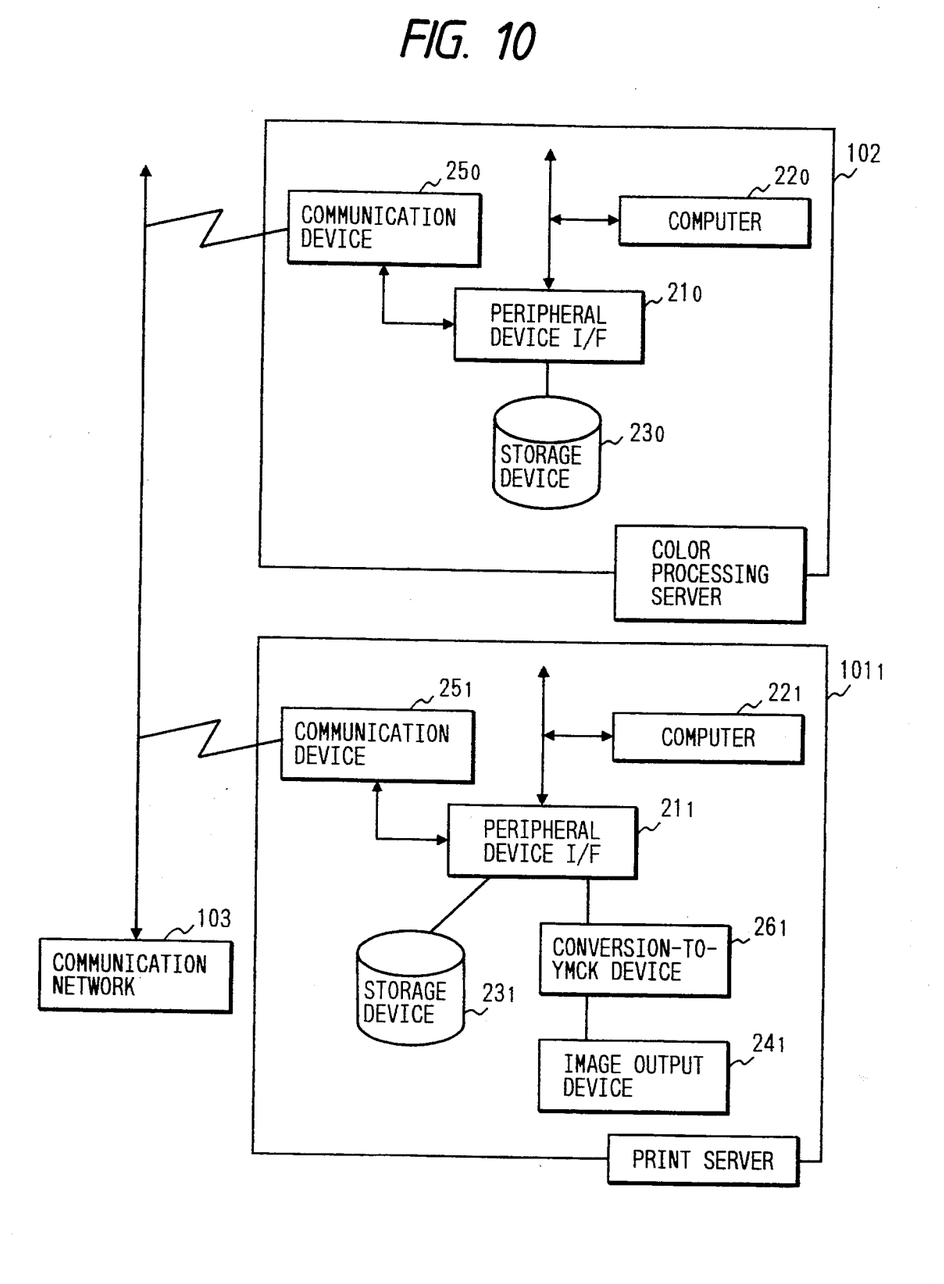
FIG. 10 is a block diagram showing the configuration of a system according to a second embodiment of the invention.

FIG. 10 shows a configuration of the second embodiment. A color processing server 102 is equivalent to a system obtained by removing the image output device 24 from the system of FIG. 2. A computer $22_0$ is connected to a storage device $23_0$ and a communication device $25_0$ via a peripheral device interface $21_0$.

A print server $101_1$ is constructed such that a computer $22_1$ is connected to a storage device $23_1$, an image output device $24_1$ and a communication device $25_1$ via a peripheral device interface $21_1$. With this configuration, the print server $101_1$, which can receive input image information from other various devices through the communication device $25_1$, can serve as a print server of a communication network 103. A plurality of print servers of this type can be connected to the communication network 103.

The print server $101_1$ uses the CIE L*a*b* as the standard color space. Since the image output device $24_1$ specifies a color by densities of YMCK inks, a conversion device $26_1$ for conversion from the standard color space to the YMCK space is provided upstream of the conversion device $26_1$.

Figure 11:
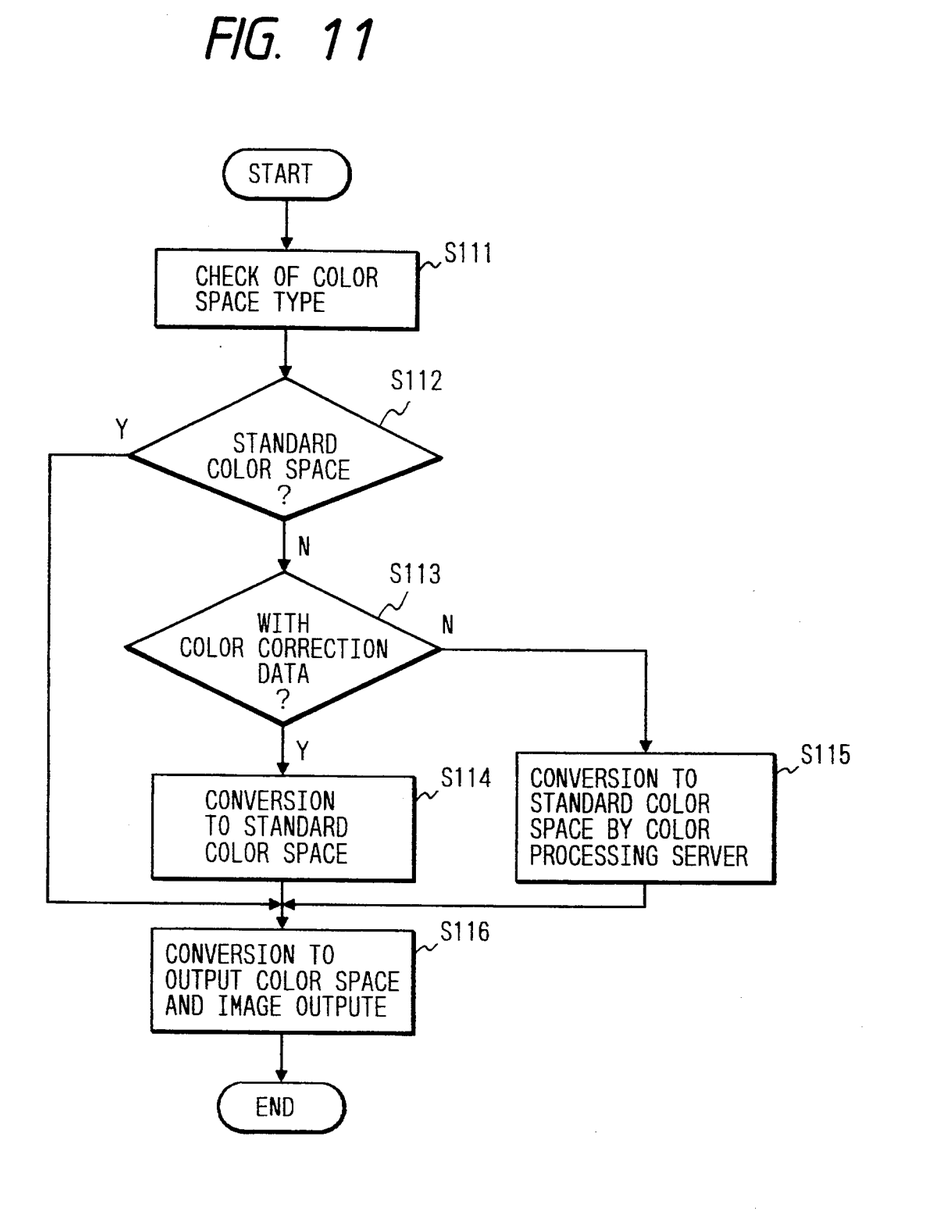
FIG. 11 is a flowchart showing a processing procedure of the system of the second embodiment.

FIG. 11 is a flowchart showing a processing procedure of the thus-constructed system of the second embodiment.

First, the color space type of the input image information is checked in step S111. Then, it is judged whether the color space is the standard color space (step S112) and, if the judgment is negative, whether the input image information is associated with color correction data (step S113).

If the input image information is judged to be on the standard color space, it is sent to the conversion-to- YMCK device $26_1$ as it is. The image information is converted to YMCK information by the conversion device $26_1$ and sent to the image output device $24_1$ to produce an image.

If the input image information is judged to se not on the standard color space but associated with color correction data, it is converted to information on the standard color space by a color conversion section $13_1$ using the color correction data (step S114). Then, the image information is converted to YMCK information by the conversion device $26_1$, and sent to the image output device $24_1$ to produce an image (step S116).

If the input image information received by the print server $101_1$ is neither on the standard color space nor associated with color correction data, it is forwarded to the color processing server 102, which is requested to perform color correction. In step S115, the color processing server 102 searches the storage device $23_0$ for color correction data suitable for the color space of the input image information, and the correction computing section converts the input image information to information on the standard color space based on the color correction data thus selected. The corrected image information is returned to the print server $101_1$. In the print server $101_1$, the image information on the standard color space is sent to the image output device $24_1$ via the conversion-to-YMCK device $26_1$ (step S116).

According to the second embodiment, since the single color processing server can be used for a variety of purposes, the system apparatuses can be simplified and their sizes can be reduced, and the hardware cost can be reduced.

Further, the second embodiment can be made more efficient by employing the mechanism of the first embodiment. That is, when receiving input image information of the third type (neither on the standard color space nor associated with color correction data), the print server $101_1$ does not sends it to the color processing server 102 but converts it to information on the standard color space based on color correction data supplied from the color processing server 102. This configuration has an advantage that the network load can be reduced.

In the second embodiment, the color correction data can be managed in a unified and intensive manner, and each printer server need not have a plurality of color correction data. Therefore, the cost of the system can be reduced in total.

Embodiment 3

Figure 12A:
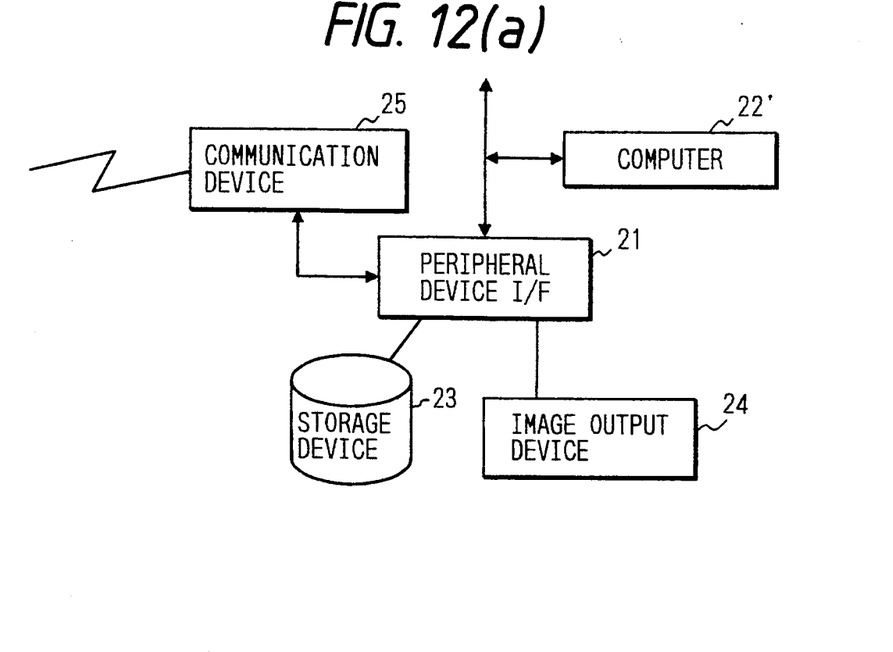
FIG. 12(a) is a block diagram showing the configuration of a system according to a third embodiment of the invention.
Figure 12B:
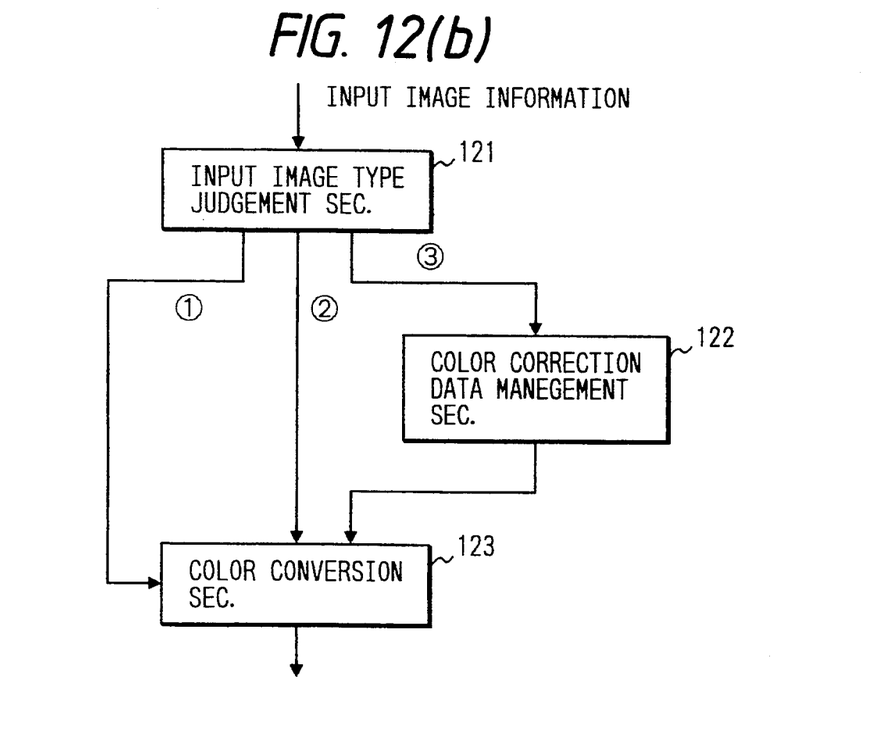
FIG. 12(b) is a block diagram showing a conversion means of the system of the third embodiment.

In the first and second embodiments, the color conversion section 13 for input image information and the color conversion section 14 of the image output device are separately provided. In contrast, in a third embodiment shown in FIGS. 12(a) and 12(b), those two color conversion sections are unified into a single color conversion section 123 to simplify the system. It becomes possible for the single color conversion section 123 to perform different operations for various kinds of input and output devices by describing color conversion processing procedures according to common specifications using the color processing description language which was explained in detail in connection with the first embodiment. The third embodiment operates in the same manner as the first and second embodiments except that the color conversion section 123 converts the image information to information on the color space suitable for the image output device 24 immediately before the image information is sent to the image output device 24. Further, by separating the system into the color processing server and the print server in the same manner as in the second embodiment, the system can further be simplified.

As described above, according to the invention, the color coincidence between an input image and an output image can be attained for a variety of input image information. That is, the color coincidence can be attained even where a variety of image input and output devices are interconnected, to provide a highly expandable system. The system of the invention can easily accommodate a new device; that is, devices can be connected to the system more easily.

Where the color correction data are described according to common specifications, the configuration to perform the color conversion can be simplified.

What is claimed is:

1. In transmitting color input image information from an image input device to an image output device by use of a color processing system to which at least one image input device and at least one image output device can be connected, a color coincidence processing method comprising the steps of:
   recognizing a color space of input image information and, if it is not a standard color space, judging whether the input image information is associated with color correction data; and
   realizing color coincidence between an input image and an output image by:
      using the standard color space, if the input image information is on the standard color space;
      performing a color correcting operation by using the color correction data associated with the input image information, if the input image information is not on the standard color space but associated with the color correction data; or
      performing a color correcting operation by using color correction data stored in the color processing system, if the input image information is neither on the standard color space nor associated with the color correction data.

2. The color coincidence processing method of claim 1, wherein the color correction data associated with the input image information and the color correction data stored in the color processing system are described according to common specifications.

3. An image processing system having an image input device that produces first image information on a first, arbitrary color space, comprising:
   means for recognizing the first color space and, if it is not a standard color space, whether the first image information is associated with color correction data to be used for conversion to the standard color space;
   means for storing a plurality of color correction data to be used for conversion to the standard color space;
   means for designating an image output device;
   means for converting the first image information not on the standard color space to second image information on the standard color space using the color correction data associated with the first image information, and for converting the first image information neither on the standard color space nor associated with color correction data to second image information on the standard color space using corresponding one of the color correction data stored in the storing means, in accordance with the recognized first color space and a color space of the designated image output device; and means for sending the first or second image information on the standard color space to the designated image output device.

4. The image processing system of claim 3, wherein the converting means uses conversion processing descriptions that are described according to specifications common to judgment results of the judging means.

5. An image processing system for processing first image information on a first, arbitrary color space sent from an image input device, comprising:

means for recognizing the first color space and, if it is not a standard color space, whether the first image information is associated with color correction data to be used for conversion to the standard color space;

means for storing a plurality of color correction data to be used for conversion to the standard color space; and means for converting the first image information not on the standard color space to second image information on the standard color space using the color correction data associated with the first image information, and for converting the first image information neither on the standard color space nor associated with color correction data to second image information on the standard color space using corresponding one of the color correction data stored in the storing means, in accordance with the recognized first color space and a color space of the image processing system.

6. An image processing system for receiving first image information on a first, arbitrary color space sent from an image input device and sending processed second image information on a second, particular color space to an image output device, comprising:

means for recognizing the first color space and, if it is not a standard color space, whether the first image information is associated with color correction data to be used for conversion to the standard color space;

means for storing a plurality of color correction data to be used for conversion to the standard color space;

means for converting the first image information not on the standard color space to second image information on the standard color space using the color correction data associated with the first image information, and for converting the first image information neither on the standard color space nor associated with color correction data to second image information on the standard color space using corresponding one of the color correction data stored in the storing means, in accordance with the recognized first color space and the particular color space; and means for sending the first or second image information on the standard color space to the image output device.

7. An image processing system which can be connected to an image input device that produces first image information on a first, arbitrary color space and to an image output device that processes image information on an arbitrary color space, comprising:

means for recognizing the first color space and, if it is not a standard color space, whether the first image information is associated with color correction data to be used for conversion to the standard color space;

means for storing a plurality of color correction data to be used for conversion to the standard color space;

means for designating an image output device;

means for converting the first image information not on the standard color space to second image information on the standard color space using the color correction data associated with the first image information, and for converting the first image information neither on the standard color space nor associated with color correction data to second image information on the standard color space using corresponding one of the color correction data stored in the storing means, in accordance with the recognized first color space and a color space of the designated image output device; and means for sending the first or second image information on the standard color space to the designated image output device.

* * * * *